US012026021B1

(12) United States Patent
Trotta et al.

(10) Patent No.: US 12,026,021 B1
(45) Date of Patent: Jul. 2, 2024

(54) CABLE CHAIN SYSTEM WITH AUTOMATIC LATCHING AND UNLATCHING

(71) Applicant: ZT Group Int'l, Inc., Secaucus, NJ (US)

(72) Inventors: Richard Trotta, Secaucus, NJ (US); Hal Loket, Secaucus, NJ (US)

(73) Assignee: ZT Group Int'l, Inc., Secaucus, NJ (US)

( * ) Notice: Subject to any disclaimer, the term of this patent is extended or adjusted under 35 U.S.C. 154(b) by 0 days.

(21) Appl. No.: 17/941,215

(22) Filed: Sep. 9, 2022

(51) Int. Cl.
*G06F 1/18* (2006.01)
*G06F 3/06* (2006.01)
*G11B 33/12* (2006.01)

(52) U.S. Cl.
CPC .............. *G06F 1/181* (2013.01); *G06F 1/187* (2013.01); *G06F 3/0689* (2013.01); *G11B 33/128* (2013.01)

(58) Field of Classification Search
CPC ....................................................... H05K 5/00
See application file for complete search history.

(56) References Cited

U.S. PATENT DOCUMENTS

2011/0013667 A1\* 1/2011 Merrow ................. G01K 1/146
374/E7.004

\* cited by examiner

*Primary Examiner* — Jerry Wu
(74) *Attorney, Agent, or Firm* — Dergosits & Noah LLP; Todd A. Noah

(57) ABSTRACT

An apparatus and method provide a cable chain system with automatic latching and unlatching that facilitates the hot-swapping of individual drives, and also the hot-swapping of an entire JBOD sled. Between an installed position and a first extended position, the apparatus maintains the connection of the sled to the shared rack infrastructure, which facilitates the hot-swapping of individual drives in the first extended position. With additional movement to a second extended position, the apparatus releases the sled, allowing the sled to be disconnected from the shared rack infrastructure.

16 Claims, 11 Drawing Sheets

CABLE CHAIN SYSTEM WITH AUTOMATIC LATCHING AND UNLATCHING

BACKGROUND

A typical feature-rich modular JBOD (Just a Bunch Of Drives) system includes multiple JBOD sleds, each sled provided with a plurality of drives. Each sled represents a node. Having multiple such nodes decreases the number of drives affected when a failure takes place.

Such a system has two serviceability features. The first feature is the ability to hot-swap individual drives, which reduces downtime by allowing the user to service individual drives without shutting down the system. The second feature is the ability to hot-swap an entire sled of drives. This feature is desirable because, when a sled itself is the cause of failure, or when servicing all the drives, the user should be able to easily replace entire an entire JBOD sled.

However, these features are in competition for the following reasons. To hot-swap individual drives, the JBOD sled must always maintain a robust connection to the shared rack infrastructure. Conversely, to hot-swap a JBOD sled requires that the JBOD sled be easily disconnected and reconnected to the shared rack infrastructure.

Thus, what is needed is an apparatus that enables and facilitates both features simultaneously.

BRIEF DESCRIPTION OF THE DRAWINGS

The embodiments are illustrated by way of example and not limitation in the accompanying drawings, in which like references indicate similar elements, and in which.

DETAILED DESCRIPTION

Embodiments described within disclose a cable chain system with automatic latching and unlatching that enables and facilitates the hot-swapping of individual drives and the hot-swapping of an entire JBOD sled by maintaining the connection of the sled robustly connected to the shared rack infrastructure when the sled is withdrawn from the chassis to a first position, which allows an individual hot-swap, and by automatically disconnecting the sled from the shared rack infrastructure when the sled is withdrawn further from the chassis.

Figure 1A:
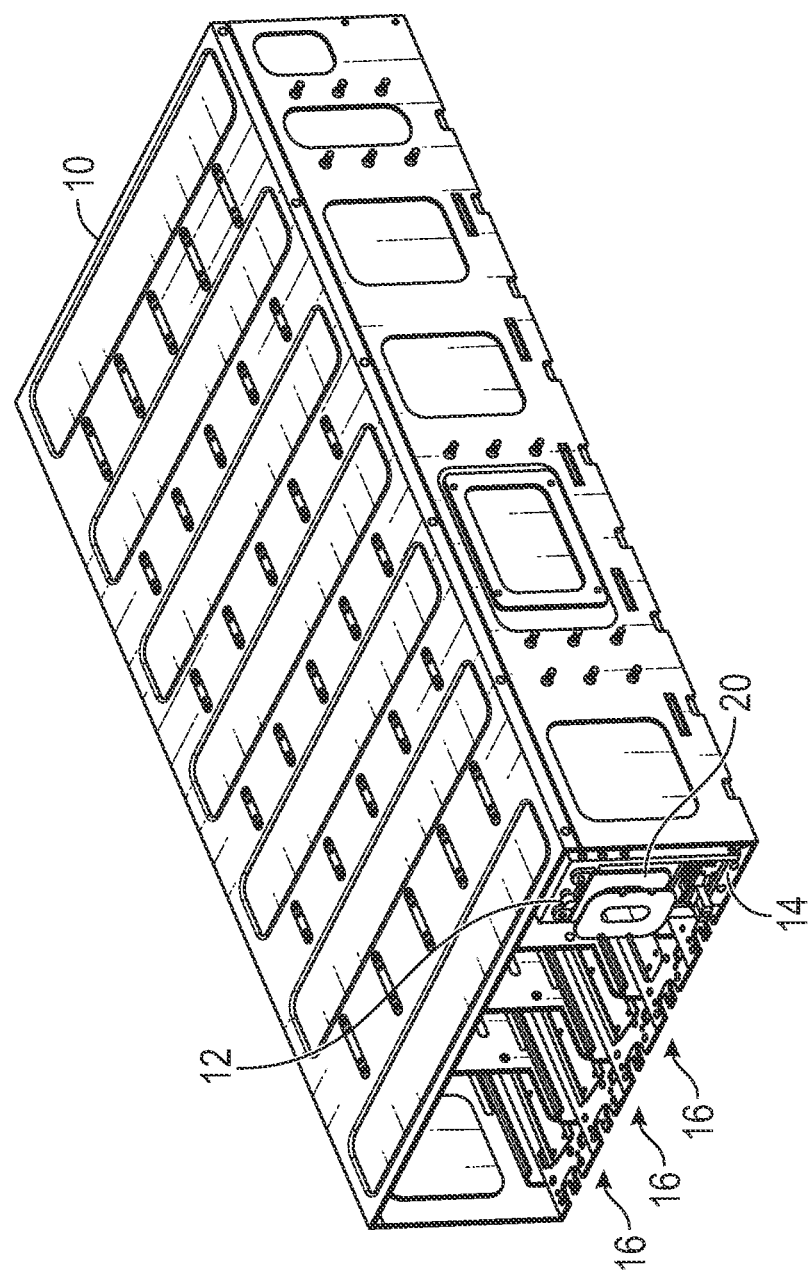
FIG. 1A is a front right isometric view illustrating an embodiment in a first state.

FIG. 1A is a front right isometric view illustrating a JBOD sled in a first state in which JBOD sled 12, and the individual drives within, are fully installed. In FIG. 1A, a chassis 10 has JBOD sled 12 fully inserted into one of JBOD sled slots 16, the other sled slots 16 being empty. Sled 12 is shown to include a latch 20 for retaining sled 12 within chassis 10. When inserted into chassis 10, sled 12 slides along a rail or track 14. Connections between sled 12 and chassis 10 are discussed further within. Not shown are connections, mechanical and electrical, between chassis 10 and the shared rack infrastructure. However, one of skill will understand that chassis 10 is configured to fit within, and be electrically connected to, a shared rack infrastructure.

Figure 1B:
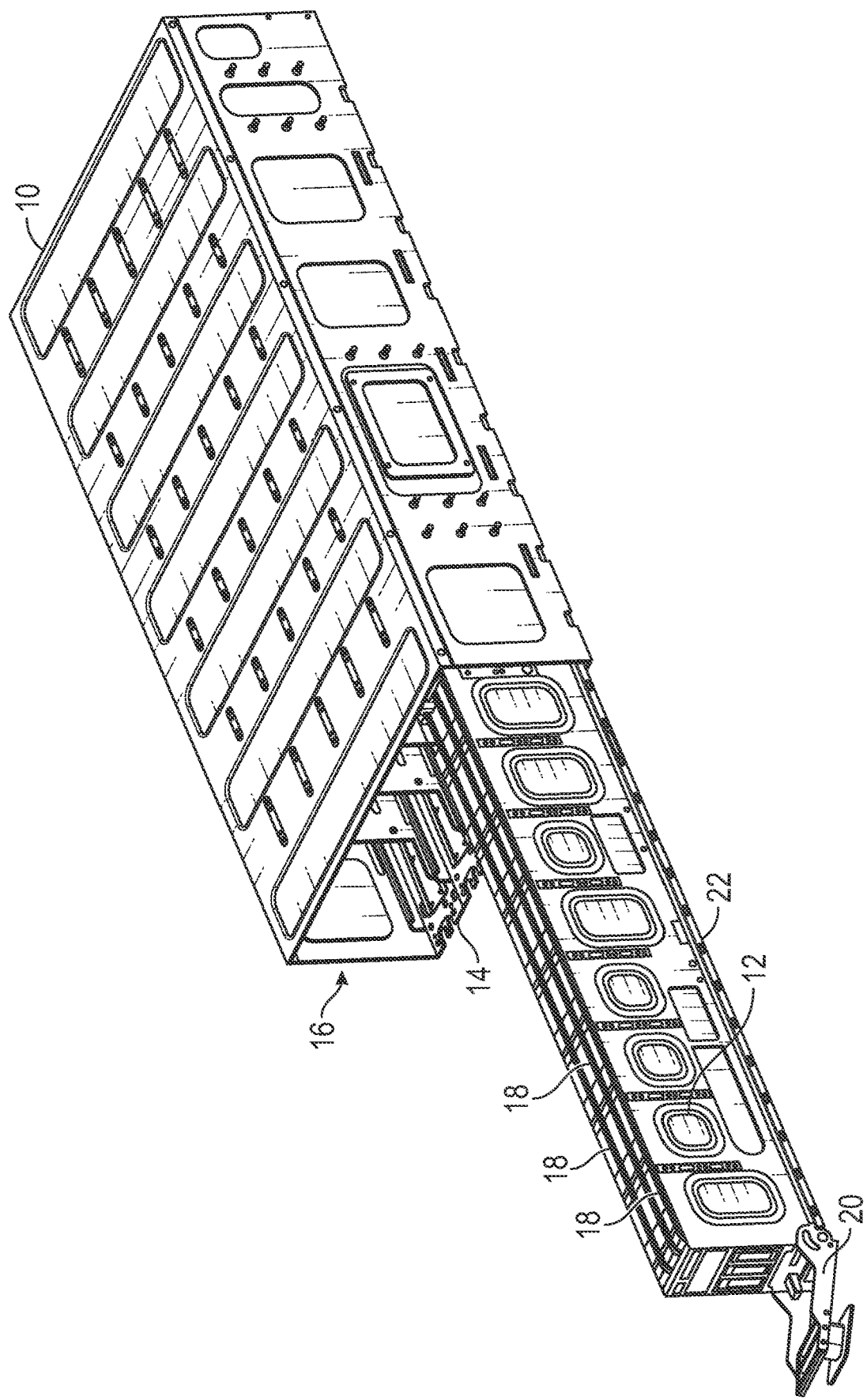
FIG. 1B is a front right isometric view illustrating the embodiment of FIG. 1A in a second state.

FIG. 1B is a front right isometric view illustrating the embodiment of FIG. 1A in a second state in which JBOD sled 12 has been extended from its slot to a first position in which an individual device 18 may be hot-swapped. In FIG. 1B, sled 12 is shown to be provided with 24 individual drives 18. In the position shown, sled 12 is extended from chassis 10 yet still electrically connected to the shared rack infrastructure (to be discussed further within). In this extended/connected position, each device 18 may be individually hot-swapped. When latch 20 is released, as shown, sled 12 may be extended from its slot with a sled base or shuttle 22 sliding along track 14 during the extension. Between the fully installed position of FIG. 1A and the extended/connected position of FIG. 1B, embodiments maintain a positive, robust electrical connection between sled 12 and chassis 10.

Figure 1C:
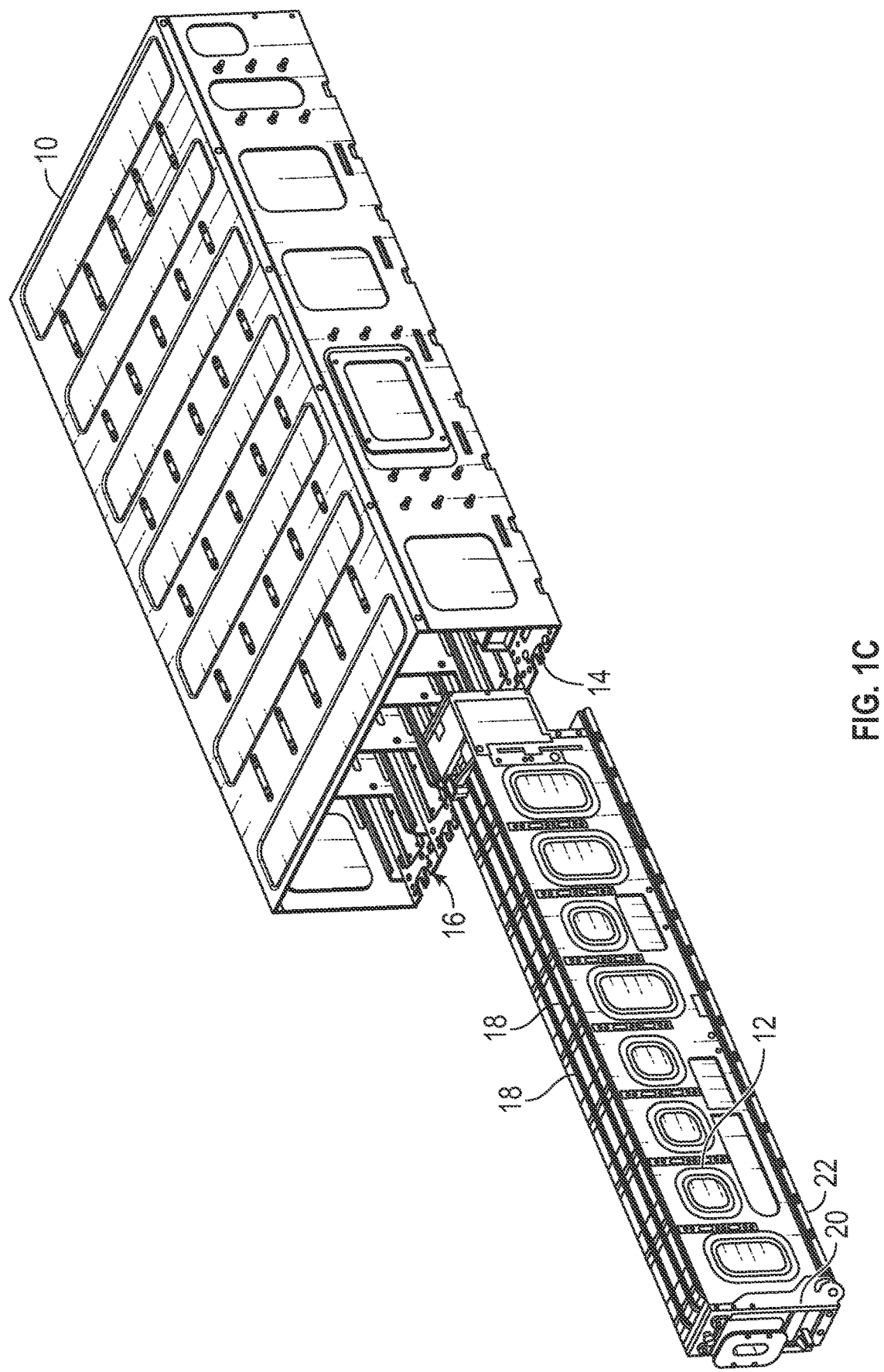
FIG. 1C is a front right isometric view illustrating the embodiment of FIG. 1A in a third state.

FIG. 1C is a front right isometric view illustrating the embodiment of FIG. 1A in a third state in which sled 12 has been completely disconnected from chassis 10. In FIG. 1C, sled 12 has been further extended from chassis 10 compared to the position of FIG. 1B. Upon the additional extension, embodiments automatically disconnect the electric and mechanical connections between sled 12 and chassis 10, facilitating the hot-swap of the sled. Conversely, when sled 12 is moved from the position of FIG. 1C to the position of FIG. 1B, embodiments automatically reconnect sled 12 to chassis 10, both electrically and mechanically.

Figure 2:
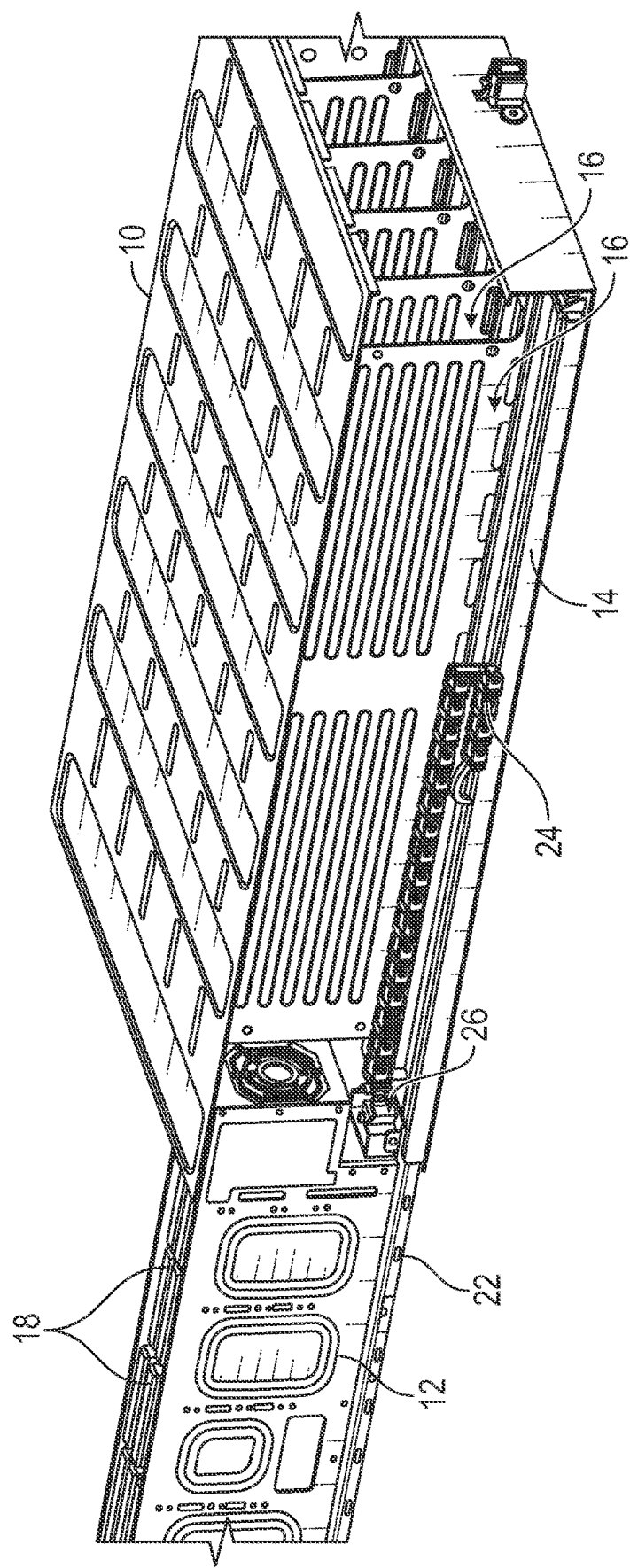
FIG. 2 is a partially-transparent rear right isometric view illustrating the embodiment of FIG. 1A in the second state of FIG. 1B.

FIG. 2 is a partially-transparent rear right isometric view illustrating the embodiment of FIG. 1A in the second state of FIG. 1B, which allows for hot-swapping the individual devices 18. In FIG. 2, a cable chain 24 including electrical connections is shown to be connected from chassis 10 to sled 12 through a connector 32 (FIG. 4) within a latching mechanism 26. As sled 12 moves from its position, shown, at the proximal end of track 14 to the distal end of track 14 (as shown in FIG. 1A), the advance of latching mechanism 26 pushes cable chain 24 before it, with cable chain 24 eventually laying between shuttle 22 and track 14. Again, between the extended/connected position of FIG. 1B and FIG. 2 and the fully installed position of FIG. 1A, embodiments maintain a positive, robust electrical connection between sled 12 and chassis 10.

Figure 3:
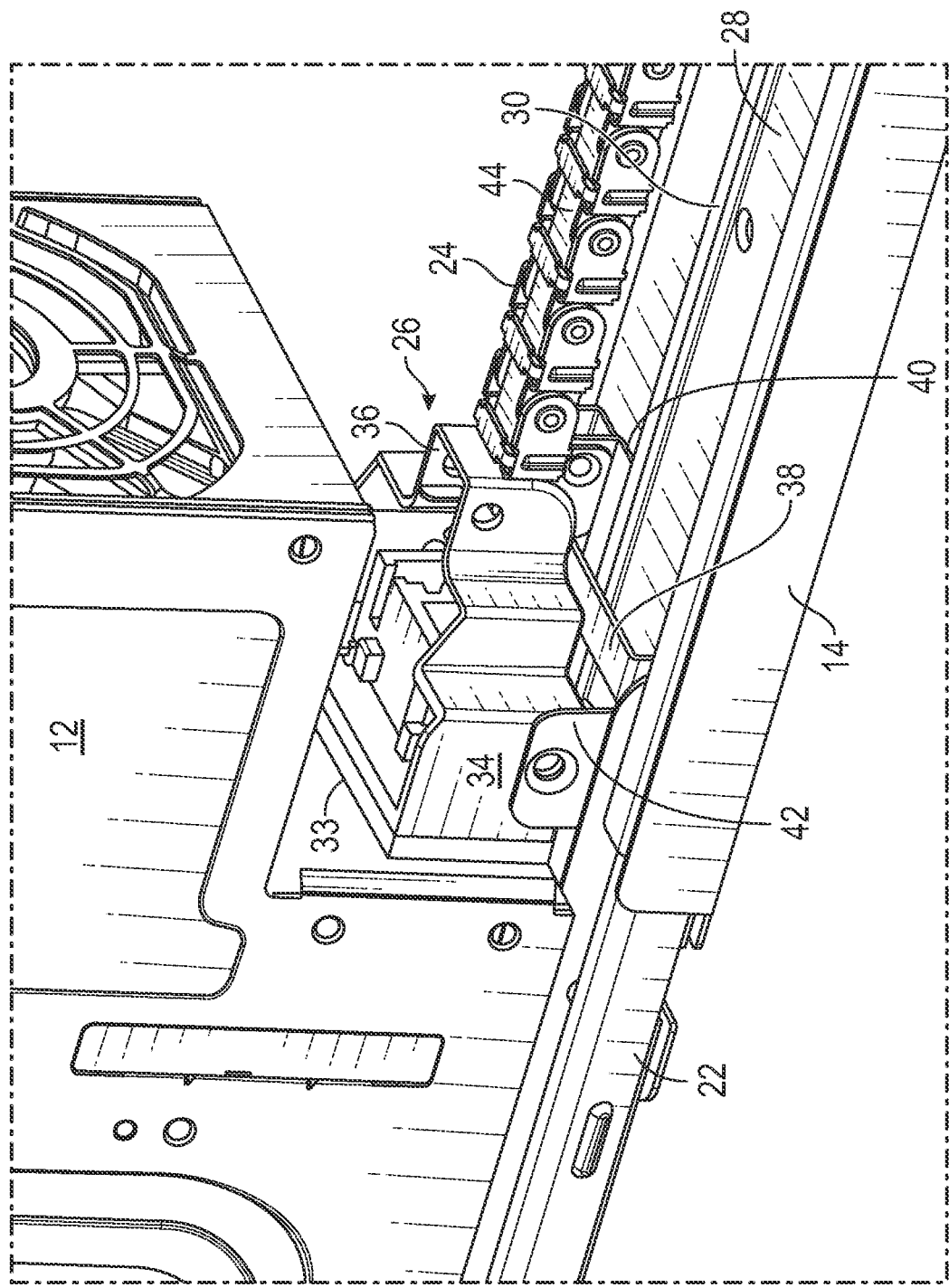
FIG. 3 illustrates further details of FIG. 2.

FIG. 3 illustrates further details of FIG. 2. Namely, FIG. 3 illustrates that shuttle 22 slides within track 14 and that latching mechanism 26 includes a cable chain attachment 36 and a cable chain sled or shuttle 38. A connector housing 34 is attached to attached to shuttle 38 using a pair of flanges 42 (the other of the pair being obscured). As shown, latching mechanism 26 is latched to shuttle 22, securing the electrical connection between sled 12 and chassis 10, which runs from a sled-side electrical connector 33, to a latching mechanism-side electrical connector 32, through cabling 44, to chassis 10. FIG. 3 illustrates a rail 28 that includes a flange 30.

Shuttle 38 travels along rail 28 with a sled flange 40 moving beneath flange 30 when shuttle 38 moves from the installed to the extended position.

Figure 4:
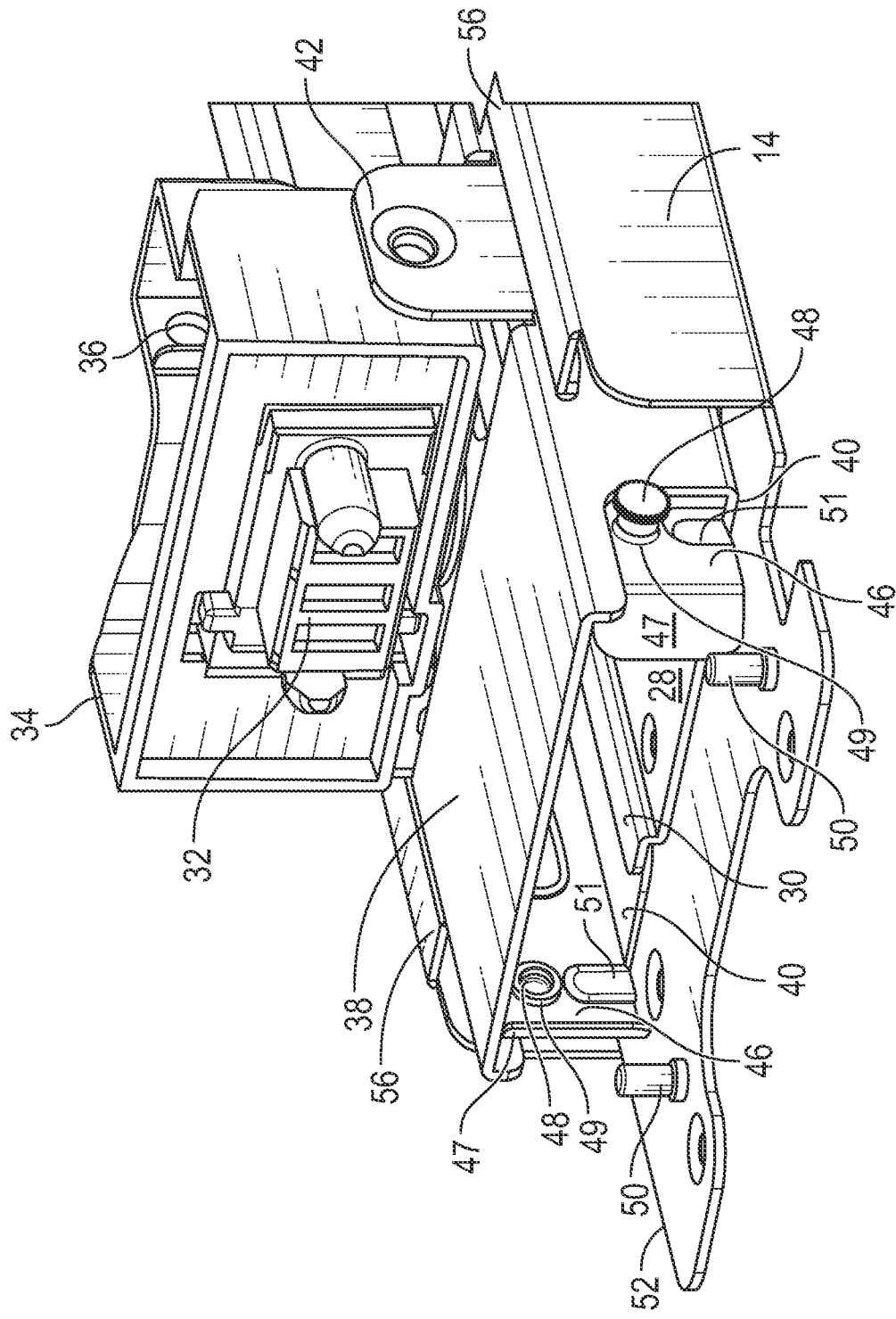
FIG. 4 is a front right isometric view illustrating elements of an embodiment.

FIG. 4 is a front right isometric view illustrating further details of FIG. 2, with the majority of sled 12 and shuttle 22 and a mating connector 33 for connector 32 not shown to provide clarity. In FIG. 4, latching mechanism 26 is shown to be retained against track 14 by flange 40 of shuttle 38 running between flange 30 of rail 28. Thus latching mechanism 26 may slide between this proximal end 52 of track 14 and a distal end of track 14.

Latching mechanism 26 is shown to further include leaf springs 46, which are configured to resist being forced inward from the positions shown toward rail 28. Leaf springs 46 each may include a flange 47, which, upon further movement of shuttle 38 toward the proximal end 52 of track 14, abuts a protrusion or stop pin 50 provided on track 14. With further movement toward proximal end 52, flanges 47 are forced inward by protrusions 50. Subsequently, flanges 47 slide past protrusions 50 until protrusions 50 are received within recesses 51 formed within leaf springs 46.

In FIG. 4, as in FIG. 2, shuttle 22 is connected to shuttle 38, though the majority of shuttle 22 is not shown. One element of shuttle 22 that is shown is a retaining protrusion or pin 48. With shuttle 22 connected to shuttle 38, as shown in FIG. 2, retaining pin 48 is received within a recess, or indentation, or hole, 49 within leaf spring 46. The bias of leaf springs 46 against being moved inward retains recesses 49 firmly about pins 48, which works to keep shuttles 22 and 38 linked together. This linking also works to keep connector 32 and the corresponding connector on sled 12 securely connected.

Figure 5:
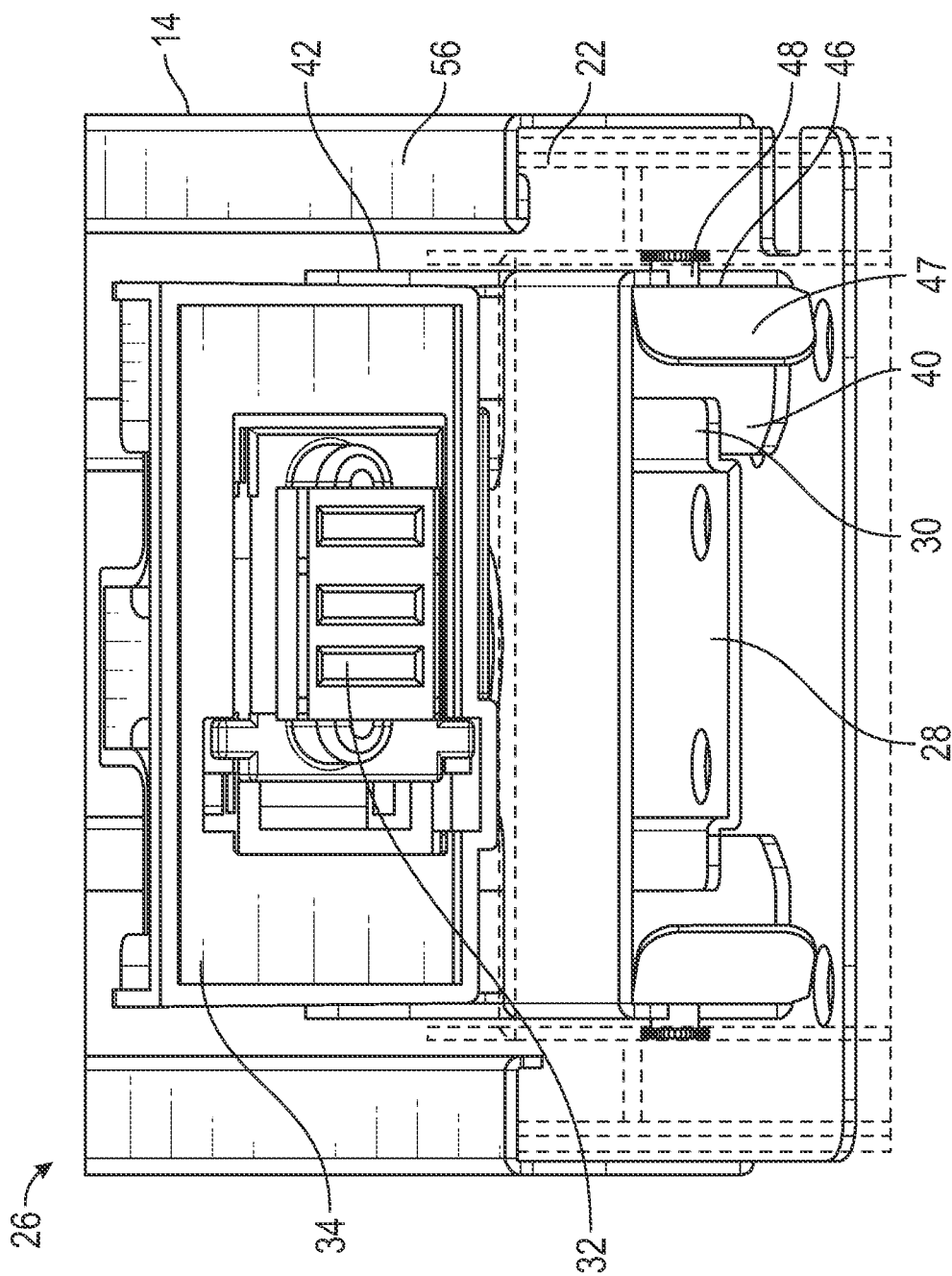
FIG. 5 is an upper front view illustrating elements of the embodiment of FIG. 4 in a first state.

FIG. 5 is an upper front view illustrating elements of the embodiment of FIG. 4 with shuttle 22 rendered transparently to further illustrate the embodiment. Mating connector 33 is not shown. In FIG. 5, retaining protrusion 48, of shuttle 22, is shown to be received by leaf spring 46, which links shuttles 22 and 38 together. Thus linked, when shuttle 22 is inserted further into track 14 toward the distal end, shuttle 38 is pushed before it. During such motion, shuttle 38 is guided along rail 28 with flanges 30 of rail 28 retain flanges 40 of shuttle 38 against track 14. Also during such motion, shuttle 22 slides within track 14, being retained by flanges 56.

This discussion of one side of the embodiment applies equally to the opposite side of the embodiment, since in the embodiment, elements are symmetric about the center plane. However, one of skill will understand that symmetry about the central plane is not required in all embodiments and that, in embodiments, elements may not exhibit symmetry, or may be entirely absent from an opposite side of the embodiment without departing from the teachings of this specification.

Figure 6:
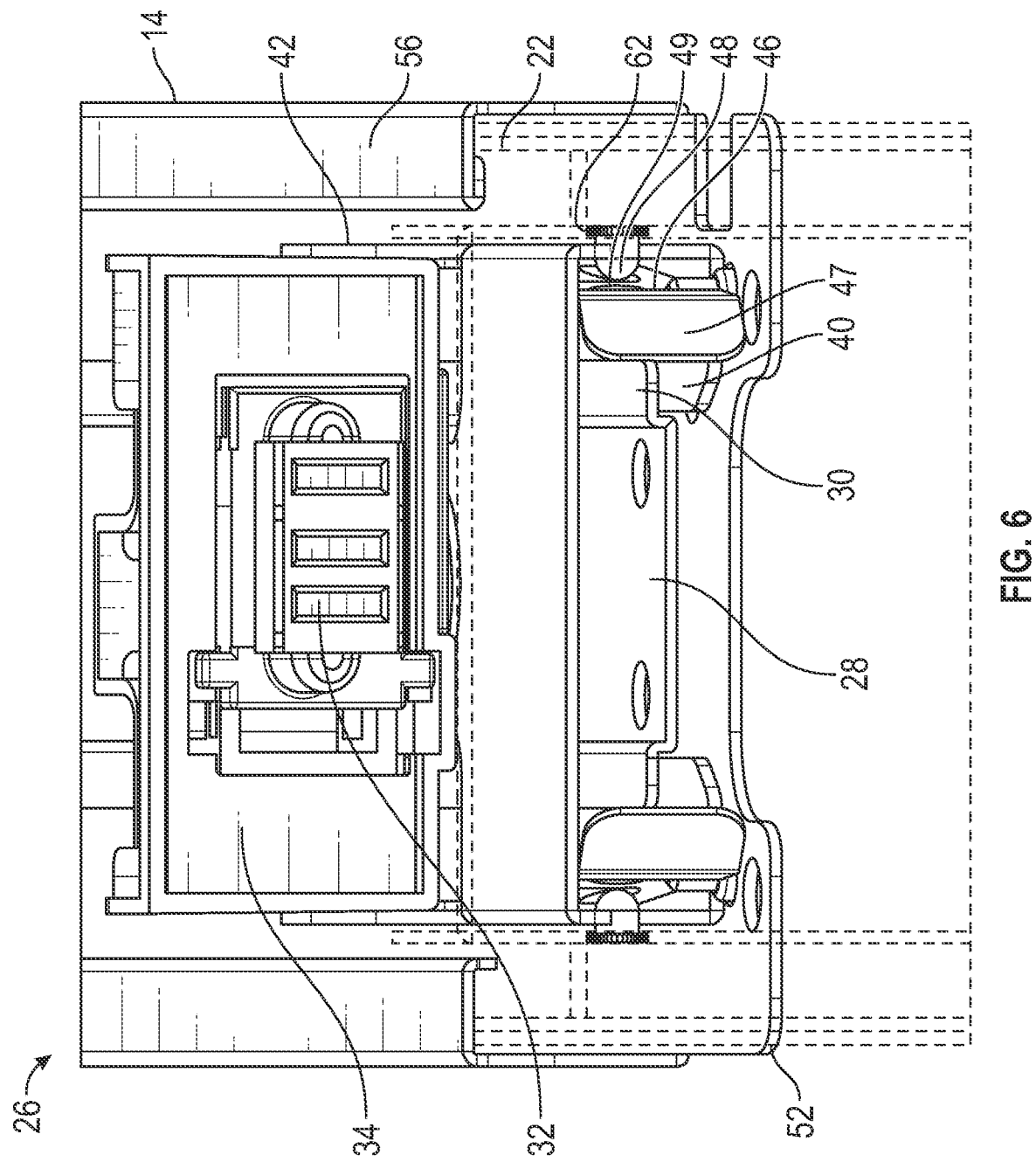
FIG. 6 is an upper front view illustrating elements of the embodiment of FIG. 4 in a second state.

FIG. 6 is an upper front view illustrating elements of the embodiment of FIG. 4 in a second state in which shuttle 22 may be disconnected from shuttle 38. From the configuration shown in FIG. 4 and FIG. 5, in which leaf springs 46 do not contact stop protrusions 50, in FIG. 6, shuttles 22 and 38 have been moved toward proximal end 52. During this motion, flanges 47 initially abutted pins 50. With further proximal motion, flanges 47 rode up and over pins 50. With even further proximal motion, leaf springs 46 slid along pins 50 until pins 50 were received within recesses 49. At this point the proximal motion of shuttle 38 was stopped by flanges 40 abutting stop protrusions 50. Also, as flanges 47 rode up and over pins 50, recesses 49 were pushed inward until retaining pins 48 were released. Thus, as shown in FIG. 6, shuttle 22 may be disconnected from shuttle 22 without being hindered by any engagement between pins 48 and recesses 49. The user need only apply enough force to disconnect connectors 32 and 33.

The change from FIG. 4 and FIG. 5 to FIG. 6 illustrates the automatic disconnection of shuttle 22 from shuttle 38, which may be accomplished by the user pulling sled 12 from housing 10, and without any user interaction with shuttle 38 and leaf springs 46.

Conversely, the change from FIG. 6 to FIG. 4 and FIG. 5 illustrates the automatic connection of shuttle 22 to shuttle 38, which may be accomplished by the user pushing sled 12 into housing 10, and without any user interaction with shuttle 38 and leaf springs 46. In the embodiment, the force of leaf springs 46 and recesses 51 are configured so that shuttle 38 remains in place while the connection between connector 33 and connector 32 is made. That is, pins 50, springs 46, and recesses 51 are configured so that more force is required to dislodge pins 50 than is required to mate connectors 32, 33, and that after the connection is made, additional force applied to sled 12 in the distal direction dislodges pins 50. Then both shuttles 22 and 38 move away distally, with pins 50 sliding along leaf springs 46 clear pins 50, at which point the spring bias forces recesses 49 about retaining pins 48, linking shuttles 22 and 38. This link between shuttles 22 and 38 maintains the connection between connectors 32 and 33 during subsequent travel to and from the distal end of track 14 by hindering any attempt to separate shuttles 22 and 38.

Figure 7:
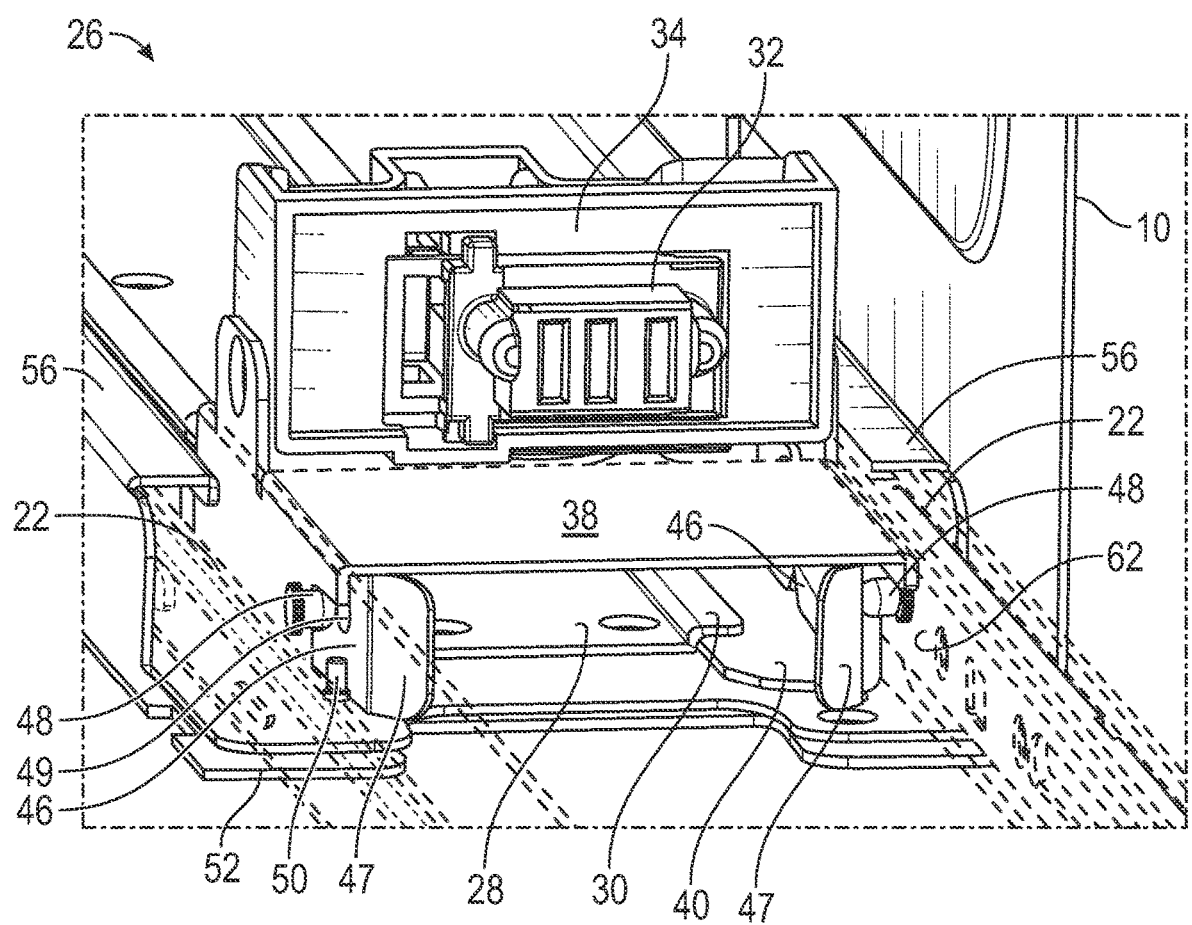
FIG. 7 is an upper front left isometric view further illustrating the second state of FIG. 6.

FIG. 7 is an upper front left isometric view further illustrating the second state of FIG. 6. FIG. 7 further illustrates the position of pin 50 within recess 51 that maintains leaf spring 46 in the inward position, which removes recesses 49 from about pins 48. As discussed, this position allows shuttle 22 (rendered transparently) to be withdrawn and separated from shuttle 38. The position also allows shuttle 22 to be pushed further along on track 14 and, with the release of leaf springs 46 from pins 50, being linked to shuttle 38. Both the linking and the unlinking may be accomplished by the user without interacting with shuttle 38. Thus, the connection and disconnection of connectors 32, 33 may be made automatically. In addition, once shuttle 22 is removed, pins 50 being within recesses 51 work to retain shuttle 38 in this position at proximal end 52, which facilitates the subsequent installation of a JBOD sled 12.

Figure 8:
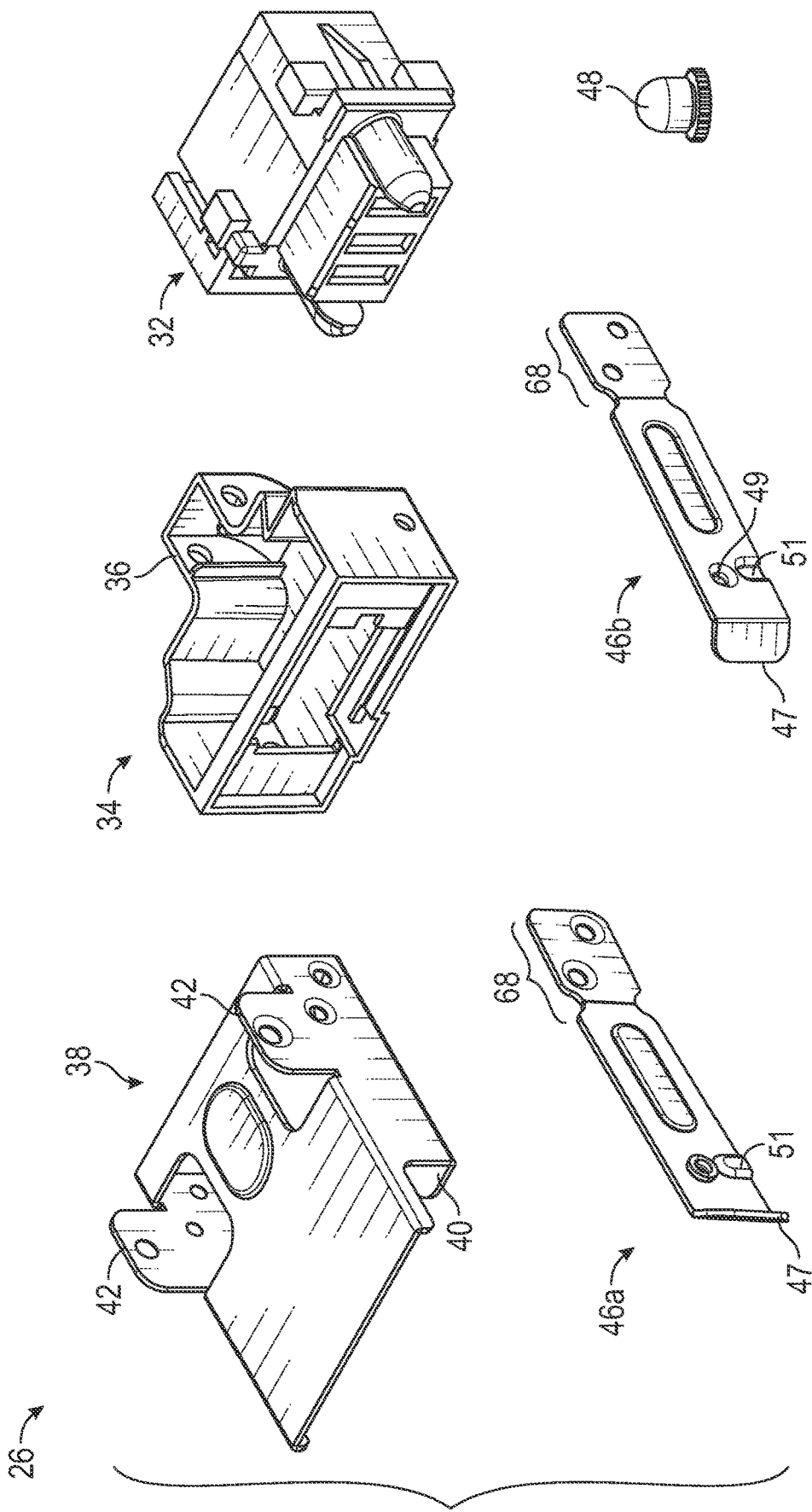
FIG. 8 is a partial assembly drawing illustrating elements of the embodiment of FIG. 4.

FIG. 8 is a partial assembly drawing illustrating individual elements of the embodiment of FIG. 4. In FIG. 8, shuttle 38 is shown to include flanges 42 for retaining connector housing 34 and flanges 40 (a second flange 40 being obscured) for retaining shuttle 38 within track 14. Connector housing 34 is shown to include cable chain attachment 36. Connector 32 is more clearly illustrated. Leaf springs 46a, 46b are shown to include a connection section 68 for connecting to shuttle 38 using fasteners (not shown). And a ridged section at the base of pin 48 indicates a diameter that may be press-fit into shuttle 22.

Figure 9:
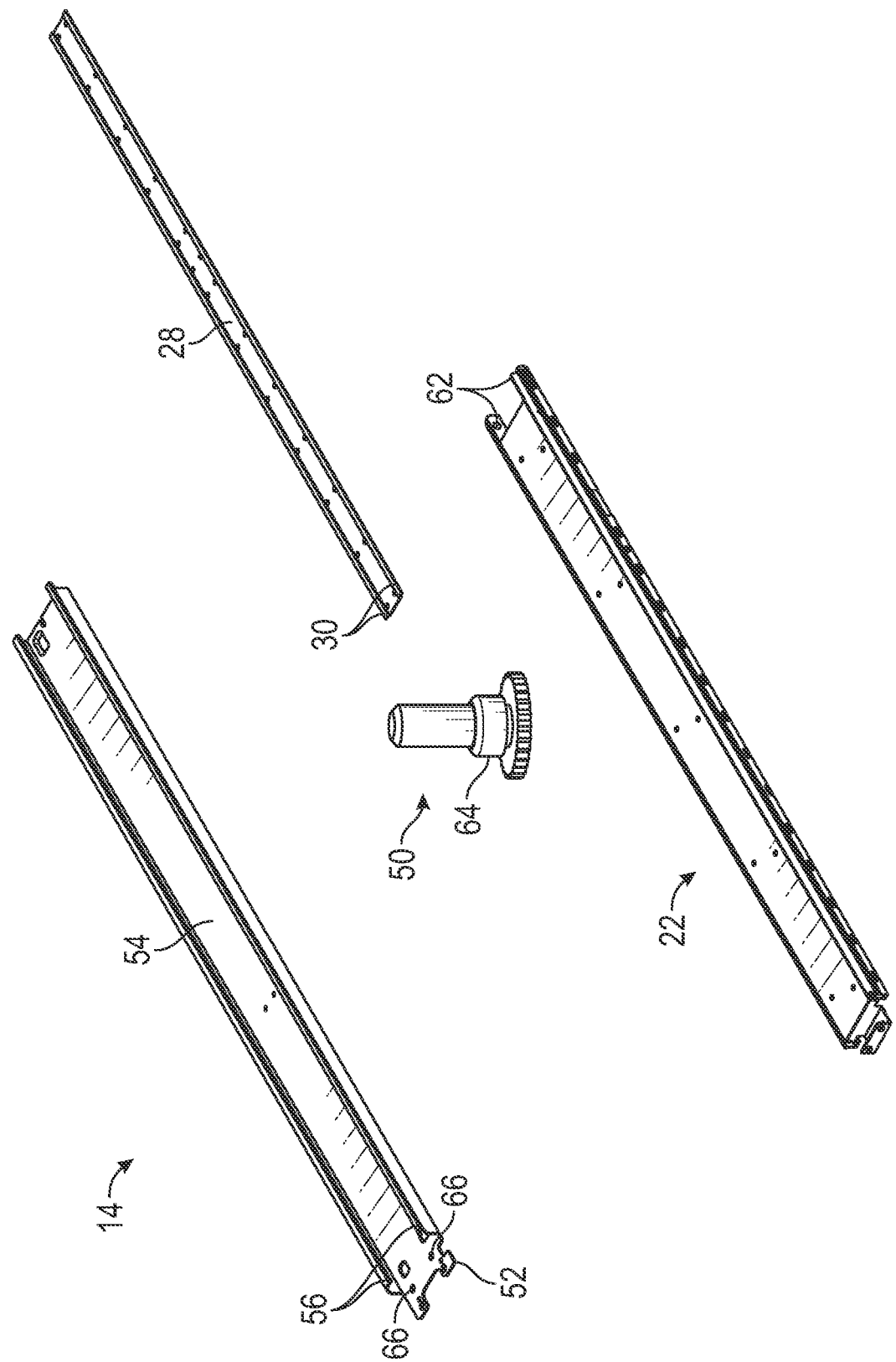
FIG. 9 is a partial assembly drawing illustrating elements of the embodiment of FIG. 4.

FIG. 9 is a partial assembly drawing illustrating individual elements of the embodiment of FIG. 4. In FIG. 9, shuttle 22 (atop of which sled 12 slides into slot 16) is shown to include holes 62 within which pins 48 may be press-fit. Pins 50 are shown to include a diameter 64, and track 14 is shown to include holes 66 within which diameter 64 of pins 50 may be press-fit. And rail 28 is shown to include holes which may be used to fasted rail 28 to an inner face 54 of track 14.

Thus, embodiments generally provide the following features. Connector 32 and shuttle 38 automatically connect to connector 33 and shuttle 22 when sled 12 is installed into the infrastructure. The link between shuttle 22 and shuttle 38 maintains a positive, robust connection between connectors 32 and 33 while shuttles 22 and 38 translate between a fully installed distal position to an extended proximal position (with leaf springs 46 in their outermost position prior to or just abutting pins 50) that allows for the hot-swap of individual drives. Connector 32 and shuttle 38 automatically disconnect from connector 33 and shuttle 22 when sled 12 is pulled further proximally such that leaf springs are forced inward by pins 50, releasing pins 48 from recesses 49.

One of skill will understand that the amount of force in the bias of leaf springs 46 against being compressed inwardly may be varied to vary the force required to connect and disconnect shuttles 22 and 38. One of skill will also understand that the function of leaf springs 46 may be implemented using different mechanical configurations, for example the face of leaf spring 46 in which recess 49 is formed may be a separate element from leaf spring 46. Similarly, the biasing force of leaf spring 46 may be applied using a coil spring in tension or compression. Furthermore, the relative positions of retaining protrusions 49 and recesses 48 may be swapped, with protrusion 49 being associated with shuttle 38 and recess 48 being associated with shuttle 22. Thus, this specification should not be understood to limit the embodiments to the arrangements shown in the figures.

The previous description is provided to enable any person skilled in the art to practice the various aspects described herein. In the embodiments, the separation of various system components in the embodiments described above should not be understood as requiring such separation in all embodiments. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. An apparatus comprising:
   a track;
   a first shuttle movable along the track, the first shuttle including a leaf spring movable against a retaining force that maintains the leaf spring in a first position when the first shuttle is at a distal position along the track, the leaf spring having a first recess;
   a first protrusion extending from the track at a proximal position along the track, wherein as the first shuttle is moved from the distal position toward the proximal position, the first protrusion abuts the leaf spring and moves the leaf spring from the first position toward a second position; and
   a second shuttle having a second protrusion that engages with the leaf spring first recess when the first shuttle is at the distal position for removably connecting the second shuttle to the first shuttle.

2. The apparatus of claim 1, wherein:
   the leaf spring includes a first flange angled such that as the first shuttle is moved from the distal position toward the proximal position, the first flange initially abuts the first protrusion and slides along the first protrusion and moves the leaf spring from the first position toward the second position.

3. The apparatus of claim 1, wherein as the connected first shuttle and second shuttle are moved from the distal position toward the proximal position and the leaf spring abuts the first protrusion and moves from the first position toward the second position, the second protrusion on the second shuttle disengages with the first recess in the leaf spring and enables separation of the first shuttle from the second shuttle.

4. The apparatus of claim 3, further comprising a first connector provided on the first shuttle and a second connector provided on the second shuttle, the first connector configured to connect to the second connector when the first shuttle is linked to the second shuttle, wherein when the leaf spring is in the second position, the first shuttle and the second shuttle may be moved such that the first connector can be connected to or disconnected from the second connector and when the leaf spring is in the first position with the first protrusion received by the first recess, the first connector and the second connector are connected, and the first protrusion and first recess inhibits the first connector from being disconnected from the second connector.

5. The apparatus of claim 4, wherein:
   the track includes a second flange positioned above a base of the track;
   the first shuttle includes a third flange; and
   the third flange travels between the second flange and the base as the first shuttle moves between the proximal position and the distal position.

6. The apparatus of claim 5, wherein movement of the first shuttle from the distal position past the proximal position is prevented by the first protrusion interfering with the third flange.

7. A method comprising:
   moving a first shuttle linked to a second shuttle along a track from a distal position to a proximal position, the second shuttle being removably connected to a leaf spring attached to the first shuttle, the leaf spring being in a first position and movable against a retaining force from the first position to second position;
   causing the leaf spring on the first shuttle to abut against a first protrusion extending from the track at a proximal position along the track as the first shuttle and second shuttle move along the track from the distal position to the proximal position; and
   causing the leaf spring to move from the first position to a second position as the first shuttle and second shuttle move along the track from the distal position to the proximal position so that the second shuttle can be disconnected from the leaf spring on the first shuttle by one of: i) disengaging a second protrusion on the second shuttle from a first recess in the leaf spring, or ii) disengaging a second protrusion on the leaf spring from a first recess on the second shuttle.

8. The method of claim 7, wherein causing the leaf spring on the first shuttle to abut against a first protrusion extending from the track at a proximal position along the track as the first shuttle and second shuttle move along the track from the distal position to the proximal position further comprises causing a first connector provided on the first shuttle to be disconnected from a second connector provided on the second shuttle.

9. The method of claim 7, further comprising causing the movement of the first shuttle and the second shuttle along the track to stop at the proximal position by a flange on the first shuttle engaging with the second protrusion.

10. A system comprising;
a chassis configured to be connected to a rack, the chassis having a track attached within a slot in the chassis;
a first shuttle movable along the track, the first shuttle including a leaf spring movable against a retaining force that maintains the leaf spring in a first position when the first shuttle is at a distal position along the track;
a second shuttle removably connected to the leaf spring on the first shuttle, the second shuttle including a sled including a plurality of electronic devices electrically coupled to the sled;
a power connector assembly connected to the first shuttle for electrically connecting the sled to the chassis; and
a first protrusion extending from the track at a proximal position along the track, wherein as the first shuttle is moved from the distal position toward the proximal position, the element abuts the second protrusion and, the first protrusion abuts the leaf spring and moves the leaf spring from the first position toward a second position, the leaf spring having a second protrusion configured to engage with a recess in the second shuttle.

11. The system of claim 10, wherein the second shuttle further comprises a second protrusion configured to engage with a recess in the leaf spring attached to the first shuttle.

12. The apparatus of claim 1, wherein the second shuttle is removably connected to the first shuttle by a second protrusion on the leaf spring that is engaged with a second recess in the second shuttle.

13. The apparatus of claim 1, wherein the leaf spring further comprises a second recess for engaging the first protrusion when the first shuttle is at the proximal position.

14. The method of claim 7, further comprising engaging the first protrusion extending from the track with a second recess in the leaf spring when the first shuttle is in the distal position.

15. The method of claim 7, further comprising disconnecting the second shuttle from the leaf spring on the first shuttle.

16. The method of claim 15, further comprising disconnecting the second shuttle from the leaf spring on the first shuttle.

* * * * *